United States Patent [19]

Singman

[11] 3,887,398

[45] June 3, 1975

[54] PREVENTION OF DETERIORATION OF LEAD DIOXIDE

[75] Inventor: David Singman, Rockville, Md.

[73] Assignee: United States of America as represented by the Secretary of the Army, Washington, D.C.

[22] Filed: Nov. 28, 1973

[21] Appl. No.: 419,821

[52] U.S. Cl. .................. 136/26; 136/27; 136/118
[51] Int. Cl. ........................................ H01m 35/00
[58] Field of Search .............................. 136/26–27, 136/34–35, 66, 75–76, 118; 423/619

[56] References Cited
UNITED STATES PATENTS
3,033,908  5/1962  Darland, Jr. ..................... 136/27
3,150,008  9/1964  Darland, Jr. ..................... 136/27
3,436,266  4/1969  Haebler ........................... 136/27

*Primary Examiner*—Anthony Skapars
*Attorney, Agent, or Firm*—Nathan Edelberg; Robert P. Gibson; Saul Elbaum

[57] ABSTRACT

An electrode for a reserve battery comprising a metal strip having a first layer of lead dioxide deposited from a nitrate bath and a second layer of lead dioxide deposited from an acetate bath, the latter having been thermally treated to convert the same to a different allotropic form. The electrode has also been treated to reduce the amount of oxidizable material to less than 0.4 coulombs/in$^2$ by an anodization process disclosed herein. The electrode is characterized by the ability to withstand storage at high temperatures for several months and remain substantially stable.

8 Claims, No Drawings

PREVENTION OF DETERIORATION OF LEAD DIOXIDE

RIGHTS OF THE GOVERNMENT

The invention described herein may be manufactured, used and licensed by or for the United States Government for governmental purposes without the payment to me of any royalty thereon.

BACKGROUND OF THE INVENTION

The invention is directed to an improvement in an electrode in a primary battery and particularly for a primary reserve battery. The improved electrode is used in a lead acid battery comprising a cell having one electrode of elemental lead, the second electrode of lead dioxide, and an electrolyte of fluoboric acid. The prior art batteries generally yield a cell voltage of 1.74 volts at 75° F. when the current drain is from 50 to 55 ma/in$^2$ and considerably lower cell voltages at lower temperatures, such as subzero temperatures of about −40° F.

The Darland, Jr. U.S. Pat. No. 3,033,908, granted May 8, 1962, describes an electrode for a lead acid battery wherein the voltage may be substantially increased at the subzero temperatures. This improvement is based upon the novel form of lead dioxide used in the electrode. The patentee teaches the use of a different allotropic deposit of lead dioxide as the cathode layer of the cell. The electrode is prepared by first depositing on a nickel plated steel strip, a layer of lead dioxide obtained from a conventional lead nitrate bath, and thereafter depositing a second layer of lead dioxide from a bath containing up to 400 gms/liter of lead acetate optionally with sodium nitrate or sodium acetate. The strip containing the two layers is then heated, after washing and drying, to remove residual water and to convert the allotrope. This thermal treatment comprises (1) packing the partially dried plate in such manner that the gaseous reaction products, principally acetic acid and water vapor, are confined to vicinity of the lead compound and (2) heating the plate to about 110°C. This treatment converts the lead deposit to a new active allotropic form of lead dioxide.

The electrode material produced by the process of the Darland, Jr. patent, will, when freshly produced, have a coulometric analysis of allotropic lead dioxide of 8 to 15 coulombs/in$^2$ and as much as 2 coulombs/in$^2$ of oxidizable materials. The analysis used throughout the present specification is a galvanostatic (constant current) coulometric analysis to determine both the amounts of acetate and nitrate deposited lead dioxide by reduction and the amount of oxidizable materials by oxidation. These tests are similar to the classic technique described by Lingane [Lingane, "Electroanalytical Chemistry", Interscience Publishers, Inc., N.Y., 1958] but differ therefrom in that the substance to be determined is a solid on the electrode of interest, rather than a substance in solution, as is described in the classic technique of the book. The material on the electrode is thus analyzed, rather than the solution in the cell, and the technique provides a sound basis for comparison of the composition of the several electrodes or for the same electrode, at different times.

It has been found that batteries made with cells containing electrodes as prepared by the technique of the Darland, Jr. patent are satisfactory when the electrodes have been freshly produced. However, when the electrodes or cells containing the electrodes have been stored for some time, particularly at elevated temperatures, the output of the cell is much less than the original output. The electrodes have been found to deteriorate during storage. In a test, a sample electrode originally contained about 12 coulombs/in$^2$ of lead dioxide and 2 coulombs/in$^2$ of oxidizable materials, but after three months of storage at 160°F., gave a coulometric analysis of allotropic lead dioxide of 4 coulombs/in$^2$ and an oxidizable material content of 6–7 coulombs/in$^2$, thereby resulting in a reduction of lead dioxide by 8 coulombs/in$^2$ and an increase in oxidizable materials of 5 to 6 coulombs/in$^2$.

OBJECTS OF THE INVENTION

One of the significant objects of the present invention is the production of batteries, particularly of the reserve battery type, and more particularly of the lead/fluoboric acid/lead dioxide type, which can be stored at high temperatures for months and which will yield higher voltages and high currents faster, after being activated by immersion of the electrodes, than similar prior art batteries.

Another object of this invention is a process for preparing a lead dioxide electrode which will yield higher voltages and greater current production than electrodes of the prior art. Another, but similar, object of this invention is the production of a lead dioxide electrode which can be stored for months without substantial deterioration and containing an allotropic deposit of lead dioxide and an amount of oxidizable material insufficient to substantially reduce the lead dioxide during storage.

A still further object of this invention is the provision of an electrode containing a first layer of lead dioxide from a nitrate bath, a second layer of lead dioxide from an acetate bath, which has been treated by heat to convert the lead dioxide to an active allotropic form, and which has been further treated to remove oxidizable material.

Still another object of the invention is an electrode containing a layer of lead dioxide deposited from an acetate bath and which has been heat treated to convert the lead dioxide to an active allotropic form and which has been anodized.

An additional object of this invention is a method for anodizing a heat treated lead dioxide electrode to scour the lead dioxide with oxygen and to remove and/or convert oxidizable material in the lead dioxide.

BRIEF SUMMARY OF THE INVENTION

Briefly, the invention relates to an electrode for an electrical cell comprising a base plate having a layer of an active allotrope of lead dioxide and containing less than 0.4 coulombs/in$^2$ of oxidizable material. The invention also relates to the production of the allotrope which comprises depositing lead dioxide from an acetate bath and thereafter thermally converting the deposited material to an allotrope by heating the material in a confined enclosure to a temperature of about 110° C. and reducing the content of oxidizable material in the lead oxide to less than 0.4 coulombs/in$^2$.

It has been found that the electrode material as produced by the process disclosed in the Darland, Jr. patent, although superior to the nitrate deposited lead dioxide electrode when freshly made, deteriorates when stored for several months at high temperatures.

It has been found that this deterioration is believed to be directly caused by the presence of oxidizable materials in the electrodes. The typical electrode produced by the process of the Darland, Jr. patent may have, at the start of storage, about 2 coulombs/in$^2$ of oxidizable material which increases during storage up to about 7 coulombs/in$^2$. It was the original analysis of the content of the electrodes, which gave a clue as to the reason for the deterioration of the electrodes.

After some experimentation it was discovered that when the heat treated lead dioxide material was further treated to reduce the amount of the oxidizable materials to not more than 0.4 coulombs/in$^2$, a particularly good electrode was obtained. In fact, when the amount of oxidizable material contained in acetate-deposited lead dioxide, in active allotropic form, is less than 0.4 coulombs/in$^2$, the cell can be stored at high temperatures for prolonged periods without significant deterioration.

It has also been discovered that the removal of the oxidizable material from the heat treated lead dioxide, deposited from acetate electrodes, also increases the voltage and current produced by the electrodes, particularly at low temperature discharge. Thus, the electrodes produced in accordance with this invention are superior to the elecrode of the Darland, Jr. process when freshly made and retain this superiority after storage.

DETAILED DESCRIPTION OF THE INVENTION

The electrodes of the present invention contain a lead dioxide layer that has been initially heat treated and thereafter anodized in order to effectively reduce the amount of oxidizable material in the electrodes.

The anodization which is believed to cause the oxidization of any acetate material within the lead dioxide layer and also to gas scrub the layer of lead dioxide to remove entrapped material, is usually carried out in a dilute nitric acid bath with a nickel counter electrode. The anodization results in the production of an electrode of heat treated lead dioxide which has a significantly lower content of oxidizable material which is believed to have been achieved by either a physical removal by the oxygen or by conversion of the compounds to a more oxidized form. It is immaterial to the successful operation of the present invention which action predominates, since it is the reduction in the amount of oxidizable material to less than 0.4 coulombs/in$^2$ which decreases the change in the electrodes during storage to an acceptable level. The anodization also apparently enables the lead dioxide layer to be more porous and more readily wetted by the electrolyte so that the electrodes enable the cell to produce a higher voltage and higher current more quickly than prior art electrodes.

Throughout the specification, the expression "oxidizable materials" refers to substances which are present with the acetate lead dioxide layer and which are capable of being oxidized when a sample of electrode stock material is anodized during the coulometric analysis which has been described above. In this case, the current flows in the reverse direction in comparison to the "usual" reduction or discharge direction. While these substances have not been fully identified, I believe that they are most likely acetic acid and/or acetate. The amount of charge required to oxidize these substances and any lower lead oxides which may be present from the initial electrode potential (in comparison with a lead reference electrode) until the oxygen potential is reached, is the measure of the quantity of oxidizable materials referred to.

The anodization may take place in a bath of dilute nitric acid solution. The minimum concentration of nitric acid concentration is that which will supply the good conductivity required for the anodization electrolyte. It has been found that a concentration of 3 to 4 percent of nitric acid is sufficient for good anodization in batch process at room temperature. The anodization can be accomplished either as a batch process or as a continuous operation on strip material. The adjustment of the nitric acid concentration may be made to suit the size and structure of the anodization vessel.

The anodization time may be short such as for 75 seconds and the current density may be that normally used in anodization such as that corresponding to about 40 amperes/sq. ft. Theoretically, the oxidization capacity density, that is, the product of current density and time, should correspond to the quantity of the oxidizable material in the electrode and should be sufficient to completely oxidize the oxidizable material, if 100 percent current efficiency could be obtained. In practice, the anodization capacity density must be sufficiently large to provide for other processes which may occur at the electrode. These other processes may include charging of the double layer at the lead dioxide-electrolyte interface, heating effects due to IR drop at the electrode-electrolyte interface, and oxygen evolution. Prolong vigorous oxygen evolution at the anode insures oxidation to the low value of about 0.4 coulombs/in$^2$ of oxidizable materials.

The voltage across the anodization cell will depend upon the cell geometry; that is, the distance between the electrodes, and the electrode current density, and will usually be quite low in the neighborhood of three volts.

The change in electrochemical capacity of the acetate-lead dioxide deposit by anodization is desirable but the major factor in the electrodes of the present invention is the ability of the electrodes to withstand long periods of storage at high temperatures.

A specific example of the process is described below, it being understood that the values given are merely representative of the process and not limiting on the process.

EXAMPLE

An electrode which had been prepared by first depositing a PbO$_2$ layer from a lead nitrate bath on a nickel plated steel strip, followed by the deposition of a second layer of PbO$_2$ layer from an acetate bath, was washed and heat treated according to the Darland, Jr. patent cited above. The electrode was then washed, rinsed and dried. The back of the plate was masked with tape. The plate was then inserted into a vessel containing a dilute nitric acid bath having a concentration of nitric acid of about 3 to 4 percent nitric acid. A nickel sheet counter electrode was placed in the vessel to complete the circuit. The voltage drop across the cell was 3.2 volts with the current density corresponding to 40 amperes per sq. ft. The anodization was continued for 75 seconds. After the anodization was complete, the electrodes were removed and the lead dioxide electrode was rinsed with distilled water and allowed to air dry at room temperature.

The nickel electrode must be protected from corrosion by the nitric acid solution. It is cathodically protected as long as the current is flowing but will be corroded when no current is flowing. The corrosion of the nickel electrode must be prevented because the presence of nickel salts in the electrolyte will contaminate the lead dioxide electrode.

The electrodes prepared according to this example had an initial content of oxidizable material in the order of 0.3 to 0.4 coulombs/in$^2$. Electrodes produced by this process were stored for three months at 160° F. and again tested. The content of oxidizable material was now 0.4 to 0.6 coulombs/in$^2$ and the acetate lead dioxide content was 14 to 15 coulombs/in$^2$. After six months storage at 160° F., amounts of oxidizable materials and acetate lead dioxide were virtually unchanged.

I wish it to be understood that I do not desire to be limited to the exact details of construction shown and described, for obvious modifications can be made by a person skilled in the art.

What is claimed is:

1. An electrode for an electrical cell comprising a base plate having a layer of an active allotrope of lead dioxide and containing less than 0.4 coulombs/in$^2$ of oxidizable material.

2. An electrode for an electrical cell according to claim 1 in which the lead dioxide layer has been anodized.

3. The electrode of claim 1 comprising a base plate, an adherent layer of tetragonal lead dioxide and an over layer of rhombohedral allotrope lead dioxide.

4. The electrode according to claim 3 wherein the electrode is anodized.

5. In a process for the production of an allotrope of lead dioxide, comprising depositing lead dioxide from an acetate bath and thermally converting the deposited material to an allotrope form by heating the material in a confined enclosure to a temperature of about 110° C., the improvement which comprises reducing the content of oxidizable material in the lead oxide to less than 0.4 coulombs/in$^2$.

6. In the process according to claim 5 in which the reduction in oxidizable material is by anodization of the lead dioxide deposit.

7. In the process according to claim 6 in which the anodization is conducted in a dilute nitric acid bath.

8. In a process according to claim 7 in which the dilute nitric acid bath contains from 3 to 4 percent nitric acid, and the temperature is normal room temperature, and current density corresponds to about 40 amperes per sq. ft. and is maintained for 75 seconds.

* * * * *